United States Patent
Uesugi (10) Patent No.: US 7,012,949 B2
(45) Date of Patent: Mar. 14, 2006

(54) OFDM GUARD BAND COMMUNICATION APPARATUS AND METHOD

(75) Inventor: Mitsuru Uesugi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 647 days.

(21) Appl. No.: 09/959,501

(22) PCT Filed: Mar. 12, 2001

(86) PCT No.: PCT/JP01/01897

§ 371 (c)(1),
(2), (4) Date: Oct. 30, 2001

(87) PCT Pub. No.: WO01/69825

PCT Pub. Date: Sep. 20, 2001

(65) Prior Publication Data

US 2003/0016731 A1    Jan. 23, 2003

(30) Foreign Application Priority Data

Mar. 15, 2000    (JP)    ............................ 2000-072818

(51) Int. Cl.
    *H04B 1/69*    (2006.01)
(52) U.S. Cl. .................................... 375/130
(58) Field of Classification Search ............. 375/130, 375/135, 140, 141, 146, 260, 295, 316; 370/208; 381/3
    See application file for complete search history.

(56) References Cited

U.S. PATENT DOCUMENTS

| | | | | |
|---|---|---|---|---|
| 3,825,674 A | * | 7/1974 | Justice | 348/385.1 |
| 5,005,169 A | * | 4/1991 | Bronder et al. | 370/497 |
| 5,072,297 A | * | 12/1991 | Kanazawa et al. | 348/480 |
| 5,602,835 A | * | 2/1997 | Seki et al. | 370/206 |
| 5,726,978 A | * | 3/1998 | Frodigh et al. | 370/252 |
| 5,822,323 A | * | 10/1998 | Kaneko et al. | 370/480 |
| 5,903,608 A | * | 5/1999 | Chun | 375/260 |
| 5,953,311 A | * | 9/1999 | Davies et al. | 370/210 |
| 5,956,318 A | * | 9/1999 | Saeki | 370/206 |
| 6,061,392 A | * | 5/2000 | Bremer et al. | 375/222 |
| 6,549,566 B1 | * | 4/2003 | Lee et al. | 375/219 |
| 6,618,352 B1 | * | 9/2003 | Shirakata et al. | 370/203 |

FOREIGN PATENT DOCUMENTS

| | | |
|---|---|---|
| JP | 07245574 | 9/1995 |
| JP | 07283806 | 10/1995 |
| JP | 08097798 | 4/1996 |
| JP | 09163330 | 6/1997 |
| JP | 09233047 | 9/1997 |
| JP | 11017643 | 1/1999 |
| JP | 11317712 | 11/1999 |
| JP | 2000049744 | 2/2000 |

OTHER PUBLICATIONS

International Search Report dated May 22, 2001.

* cited by examiner

*Primary Examiner*—Robert Pascal
*Assistant Examiner*—Krista M. Flanagan
(74) *Attorney, Agent, or Firm*—Stevens, Davis, Miller & Mosher, LLP (57) ABSTRACT

A transmitting apparatus and method may inverse Fourier transform transmit data converted to parallel form to obtain a first signal. The band of a second signal is limited to a guard frequency band adjacent to the band of the first signal, and a signal comprising the first and second signals is transmitted.

15 Claims, 10 Drawing Sheets

OFDM GUARD BAND COMMUNICATION APPARATUS AND METHOD

TECHNICAL FIELD

The present invention relates to a transmitting apparatus, receiving apparatus, and data transmission method for use in a communication terminal apparatus and base station apparatus of a mobile communication system using the OFDM (Orthogonal Frequency Division Multiplex) modulation method.

BACKGROUND ART

Technology traditionally relating to OFDM modulation mobile communication systems has been disclosed in Unexamined Japanese Patent Publication No. HEI 11-17643.

Figure 1:
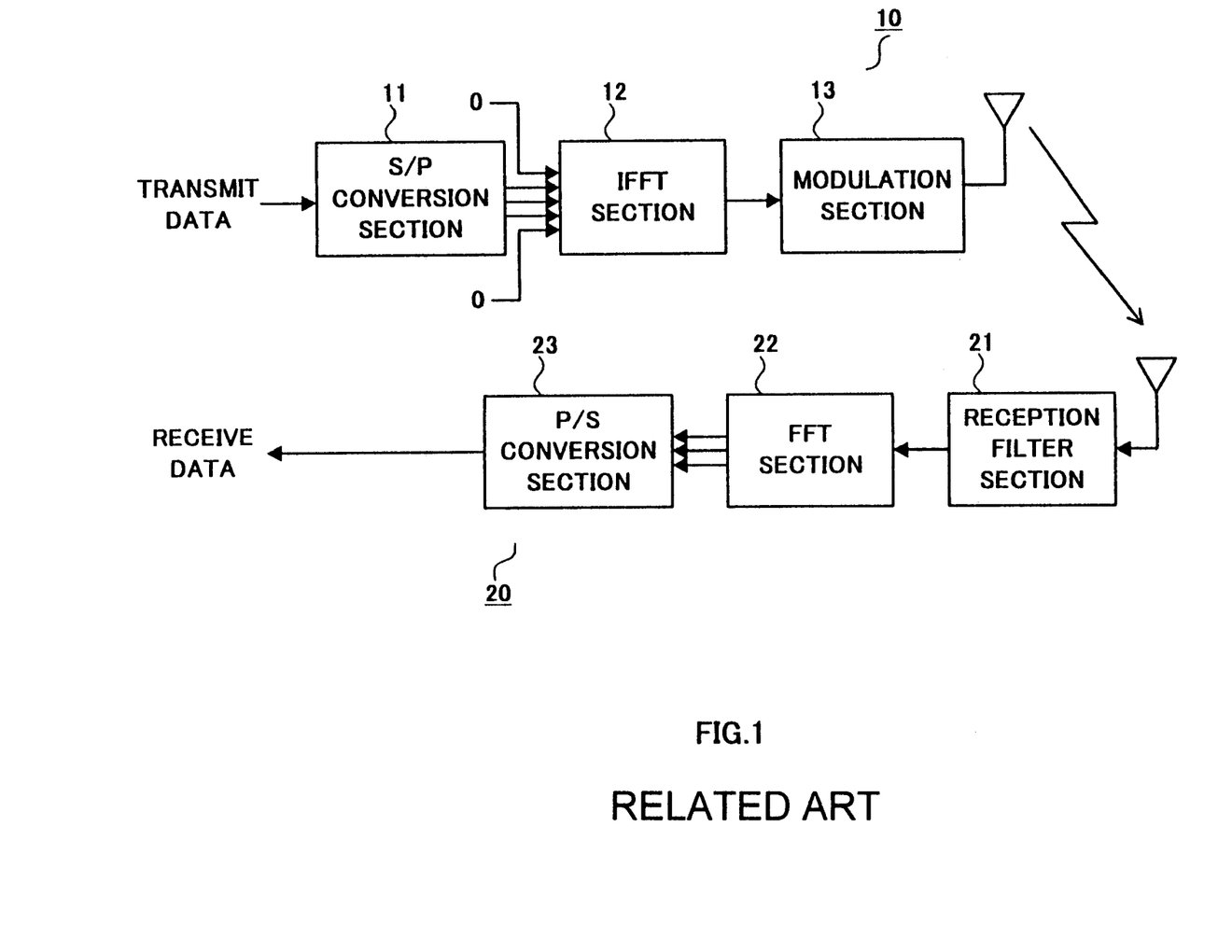
FIG. 1 is a block diagram showing the configuration of a conventional transmitting apparatus and receiving apparatus.

FIG. 1 is a block diagram showing the configuration of a conventional transmitting apparatus and receiving apparatus. The transmitting apparatus and receiving apparatus in FIG. 1 are provided, respectively, in a base station apparatus and communication terminal apparatus in an OFDM modulation mobile communication system.

The transmitting apparatus 10 mainly consists of an S/P (Serial/Parallel) conversion section 11, an IFFT (Inverse Fast Fourier Transform) section 12, and a modulation section 13. The receiving apparatus 20 mainly consists of a reception filter section 21, an FFT (Fast Fourier Transform) section 22, and a P/S (Parallel/Serial) conversion section 23.

With this kind of configuration, transmit data undergoes parallel conversion to N (where N is a natural number) subcarriers by the S/P conversion section 11 in the transmitting apparatus 10, then undergoes an inverse Fourier transform together with 2M (where M is a natural number) 0 data units by the IFFT section 12, and after being modulated by the modulation section 13, is transmitted as a radio signal from an antenna.

A radio signal transmitted from the transmitting apparatus 10 is received by the antenna of the receiving apparatus 20, and a signal of a predetermined frequency is passed by the reception filter section 21, is demodulated by undergoing a Fourier transform by the FFT section 22, and is converted to serial form by the P/S conversion section 23. By this means, receive data is obtained.

Figure 2:
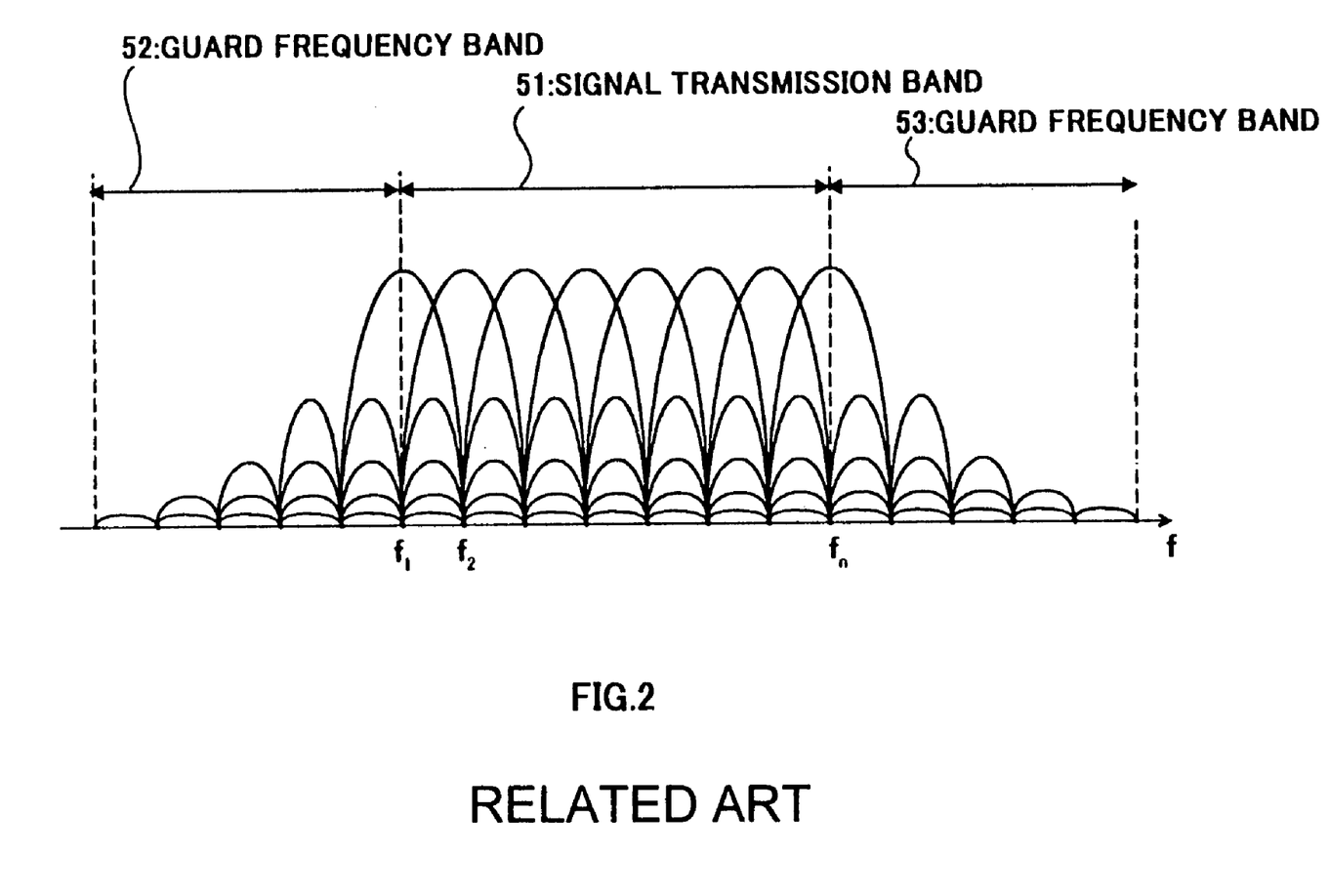
FIG. 2 is a frequency spectrum diagram for the conventional OFDM modulation method.

FIG. 2 is a frequency spectrum diagram for the conventional OFDM modulation method. As shown in FIG. 2, with the OFDM modulation method, a signal transmission band 51 is provided in which there is a plurality of carrier frequency signals f1 to fn. In the signal transmission band 51, adjacent carrier frequency signals are arranged so that—with f1 and f2, for example—the 0 level point of one carrier frequency signal f2 overlaps the peak level point of the other carrier frequency signal f1 on the same frequency axis.

Also, with the OFDM modulation method, the frequency intervals at which a peak level point and 0 level point overlap are equal intervals, being a frequency interval which is the inverse of the symbol rate. For example, with a symbol rate of 1 μsec, the frequency interval is every 1 MHz.

Also, guard frequency bands 52 and 53—bands in which a carrier is not used—are provided on either side of the signal transmission band 51. This is done to suppress power leakage outside band 51 and prevent influence on other communications.

However, in a mobile communication system that uses the conventional OFDM modulation method, the fact that guard frequency bands 52 and 53 are not used for signal transmission presents a problem in that spectrum efficiency is reduced proportionately.

Moreover, with the OFDM modulation method, there is a problem in that the amplitude (peak) at a point at which the same carrier frequency signals overlap is large with respect to the average power, and as a countermeasure to this, a small number of carriers are allocated for peak suppression in a conventional mobile communication system. However, when peak suppression carriers are provided, there is a problem of a further drop in spectrum efficiency.

DISCLOSURE OF INVENTION

It is an objective of the present invention to provide a transmitting apparatus, receiving apparatus, and data transmission method that enable spectrum efficiency to be improved by using guard frequency bands efficiently.

This objective is achieved by superimposing broadcast information, peak suppression signals, and so forth, in the guard frequency bands.

BEST MODE FOR CARRYING OUT THE INVENTION

With reference now to the attached drawings, embodiments of the present invention will be explained in detail below.

(Embodiment 1)

Figure 3:
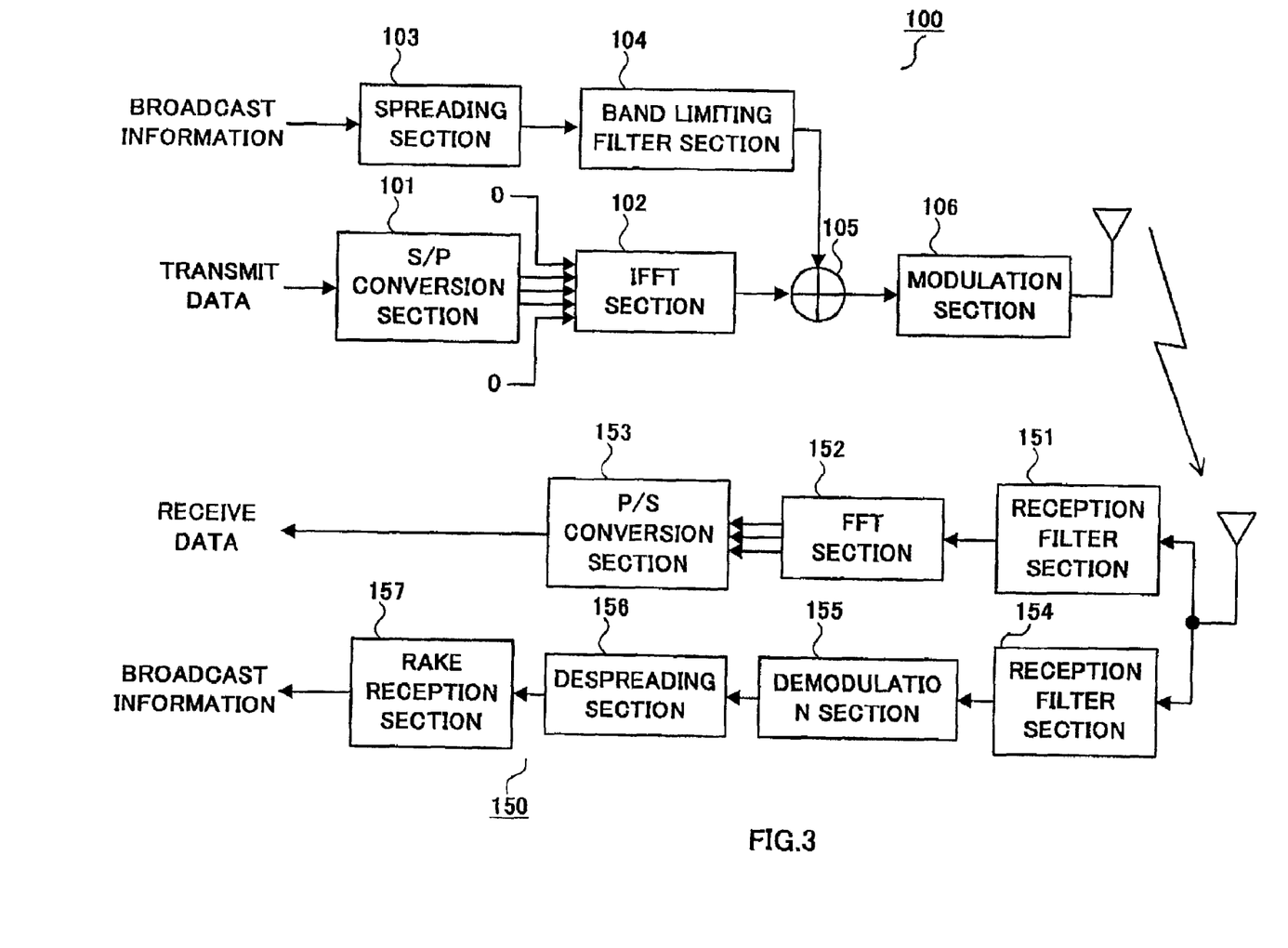
FIG. 3 is a block diagram showing the configuration of a transmitting apparatus and receiving apparatus according to Embodiment 1 of the present invention.

FIG. 3 is a block diagram showing the configuration of a transmitting apparatus and receiving apparatus according to Embodiment 1 of the present invention. The transmitting apparatus and receiving apparatus in FIG. 3 are provided respectively in a base station apparatus and communication terminal apparatus in an OFDM modulation mobile communication system. In this embodiment, a description is given of radio communication between a transmitting apparatus provided in a base station apparatus and a receiving apparatus provided in a communication terminal apparatus.

The transmitting apparatus 100 mainly consists of an S/P conversion section 101, IFFT section 102, spreading section 103, band limiting filter section 104, adding section 105, and modulation section 106.

The S/P conversion section 101 performs parallel conversion of serial transmit data to N (where N is a natural number) subcarriers. The IFFT section 102 performs an inverse Fourier transform on N (where N is a natural number) subcarriers together with 2M (where M is a natural number) 0 data units for forming guard frequency bands. As a result of this inverse Fourier transform, an OFDM modulation signal is output.

The spreading section 103 multiplies broadcast information by a spreading code. The band limiting filter section 104 performs limitation so that the spread broadcast information band becomes a guard frequency band. By means of this band limitation, broadcast information is superimposed on a guard frequency band. Hereinafter, broadcast information for which the band is limited to a guard frequency band is referred to as a "band limited signal".

The adding section 105 adds together the OFDM modulation signal output from the IFFT section 102 and the band limited signal output from the band limiting filter section 104. The modulation section 106 modulates the output signal from the adding section 105 and transmits it as a radio signal from the antenna.

The receiving apparatus 150 mainly consists of a reception filter section 151, an FFT section 152, a P/S conversion section 153, a reception filter section 154, a demodulation section 155, a despreading section 156, and a rake reception section 157.

Reception filter section 151 passes only signals in the signal transmission band among received signals. The FFT section 152 demodulates a signal that has passed through reception filter section 151 by performing a Fourier transform. The P/S conversion section 153 performs serial conversion of the output signal from the FFT section 152 to obtain receive data.

Reception filter section 154 passes only signals in a guard frequency band among received signals. The demodulation section 155 demodulates a signal that has passed through reception filter section 154. The despreading section 156 multiplies the output signal from the demodulation section 155 by the same spreading code as used by the spreading section 103. The rake reception section 157 performs rake reception of the output signal from the despreading section 156 to obtain broadcast information.

Next, the operation will be described when data is transmitted from transmitting apparatus 100 to receiving apparatus 150 with the above-described configuration. Transmit data undergoes parallel conversion to N (where N is a natural number) subcarriers by the S/P conversion section 101 in the transmitting apparatus 100, and then undergoes an inverse Fourier transform together with 2M (where M is a natural number) 0 data units by the IFFT section 102, and becomes an OFDM modulation signal.

Broadcast information is spread by the spreading section 103, and is band-limited by the band limiting filter section 104 so as to become a guard frequency band.

The OFDM modulation signal output from the IFFT section 102 and the band limited signal output from the band limiting filter section 104 are added, then modulated by the modulation section 106, and transmitted from the antenna.

A radio signal transmitted from the transmitting apparatus 100 is received by the antenna of the receiving apparatus 150, and is output to reception filter section 151 and reception filter section 154.

A signal in the signal transmission band that has passed through reception filter section 151 is demodulated by undergoing a Fourier transform by the FFT section 152, and is converted to serial form by the P/S conversion section 153. By this means, receive data is obtained.

A signal in a guard frequency band that has passed through reception filter section 154 is demodulated by the demodulation section 155 and despread by the despreading section 156, and undergoes rake reception by the rake reception section 157. By this means, broadcast information is obtained.

Figure 4:
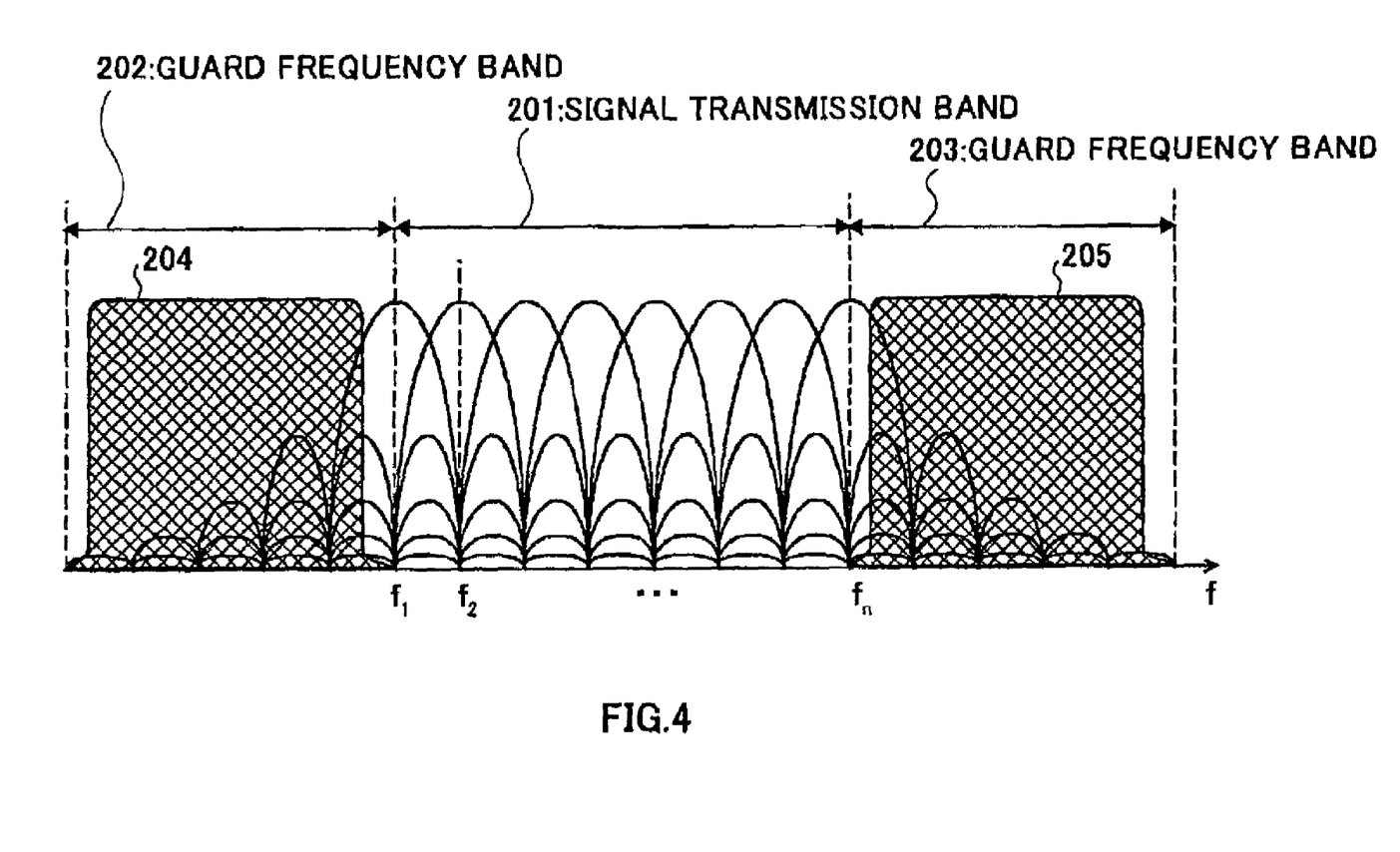
FIG. 4 is a frequency spectrum diagram for the OFDM method of Embodiment 1 of the present invention.

FIG. 4 is a frequency spectrum diagram for the OFDM method of this embodiment. As shown in FIG. 4, with the OFDM modulation method, a signal transmission band 201 is provided in which there is a plurality of carrier frequency signals f1 to fn. Also, guard frequency bands 202 and 203 are provided on either side of the signal transmission band 201. In this embodiment, broadcast information 204 and 205 is band-limited and superimposed on guard frequency bands 202 and 203.

Superimposing broadcast information on guard frequency bands in this way makes it possible for guard frequency bands also to be used for signal transmission, enabling spectrum efficiency to be improved.

Also, since OFDM modulation signals and band limited signals comprising band limited broadcast information can be transmitted from the same antenna on the transmitting side, and received by the same antenna on the receiving side, fading correlation is high, and the SIR (Signal to Interference Ratio) is not so poor, with the result that data can be transmitted with a certain level of quality.

Although there are no restrictions on the band limited signal multiplexing method and modulation method, if the CDMA method is used as described above, band limited signals are resistant to interference and their quality is improved.

The signals superimposed on guard frequency bands are not limited to broadcast information, and may comprise any kind of information. For example, if a peak suppression signal is superimposed instead of broadcast information, peak suppression can be performed.

(Embodiment 2)

Figure 5:
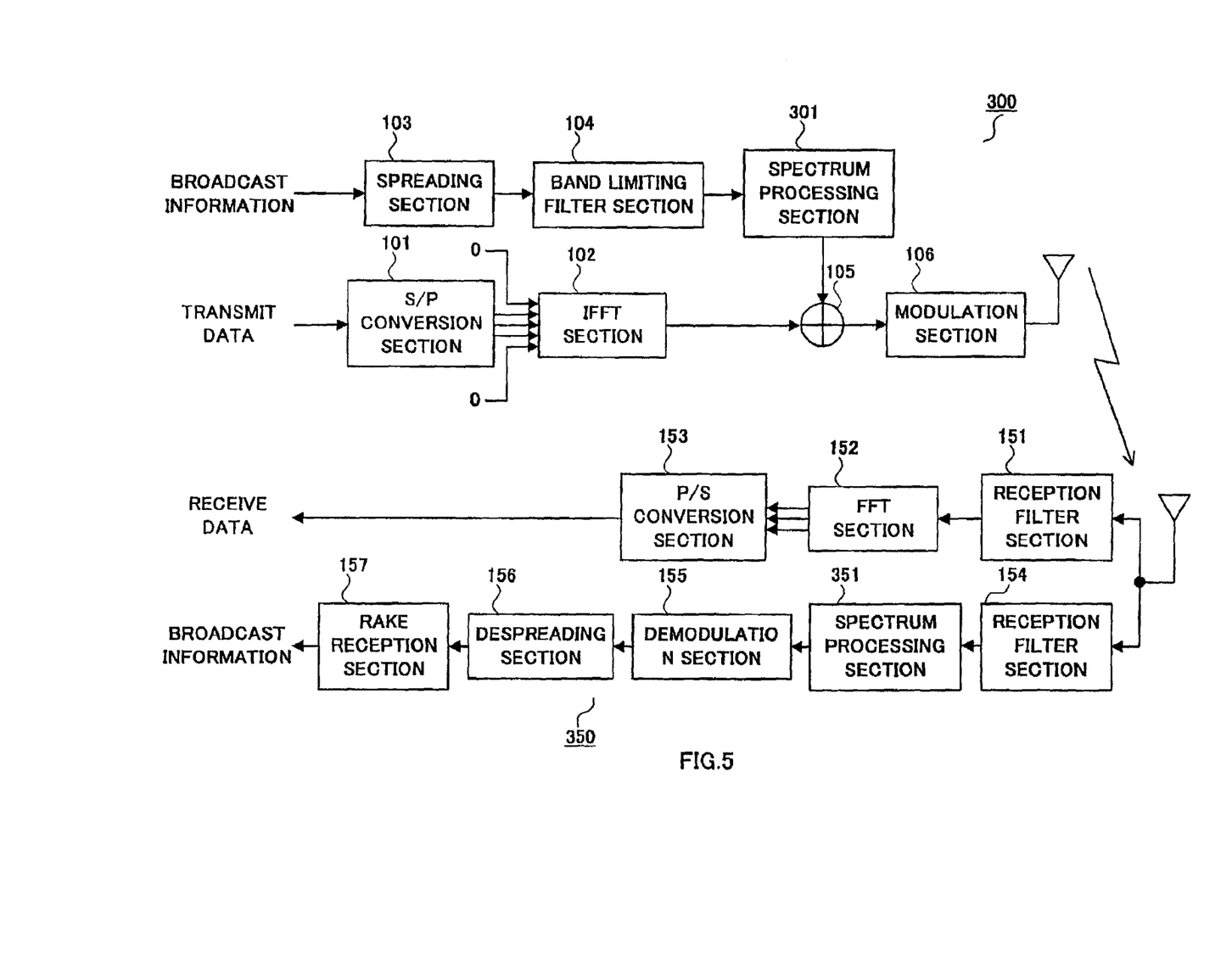
FIG. 5 is a block diagram showing the configuration of a transmitting apparatus and receiving apparatus according to Embodiment 2 of the present invention.

FIG. 5 is a block diagram showing the configuration of a transmitting apparatus and receiving apparatus according to Embodiment 2 of the present invention. The parts of the transmitting apparatus and receiving apparatus in FIG. 5 identical to those in FIG. 3 are assigned the same codes as in FIG. 3 and their detailed explanations are omitted.

The configuration of the transmitting apparatus 300 shown in FIG. 5 features the addition of a spectrum processing section 301 to the transmitting apparatus 100 shown in FIG. 3.

The spectrum processing section 301 performs processing of the frequency spectrum of band limited signals output from the band limiting filter section 104 so that portions are larger the nearer they are to the signal transmission band (hereinafter referred to as "spectrum coloring").

The adding section 105 adds together an OFDM modulation signal output by IFFT section 102 and a band limited signal output from the band limiting filter section 104 that has undergone spectrum coloring by the spectrum processing section 301.

The configuration of the receiving apparatus 350 shown in FIG. 5 features the addition of a spectrum processing section 351 to the receiving apparatus 150 shown in FIG. 3.

Spectrum processing section 351 performs the opposite of the processing performed by spectrum processing section 301 on a band limited signal received via reception filter section 154 (hereinafter referred to as "spectrum decoloring") By means of this spectrum decoloring, a received band limited signal returns to its original flat spectrum.

Figure 6:
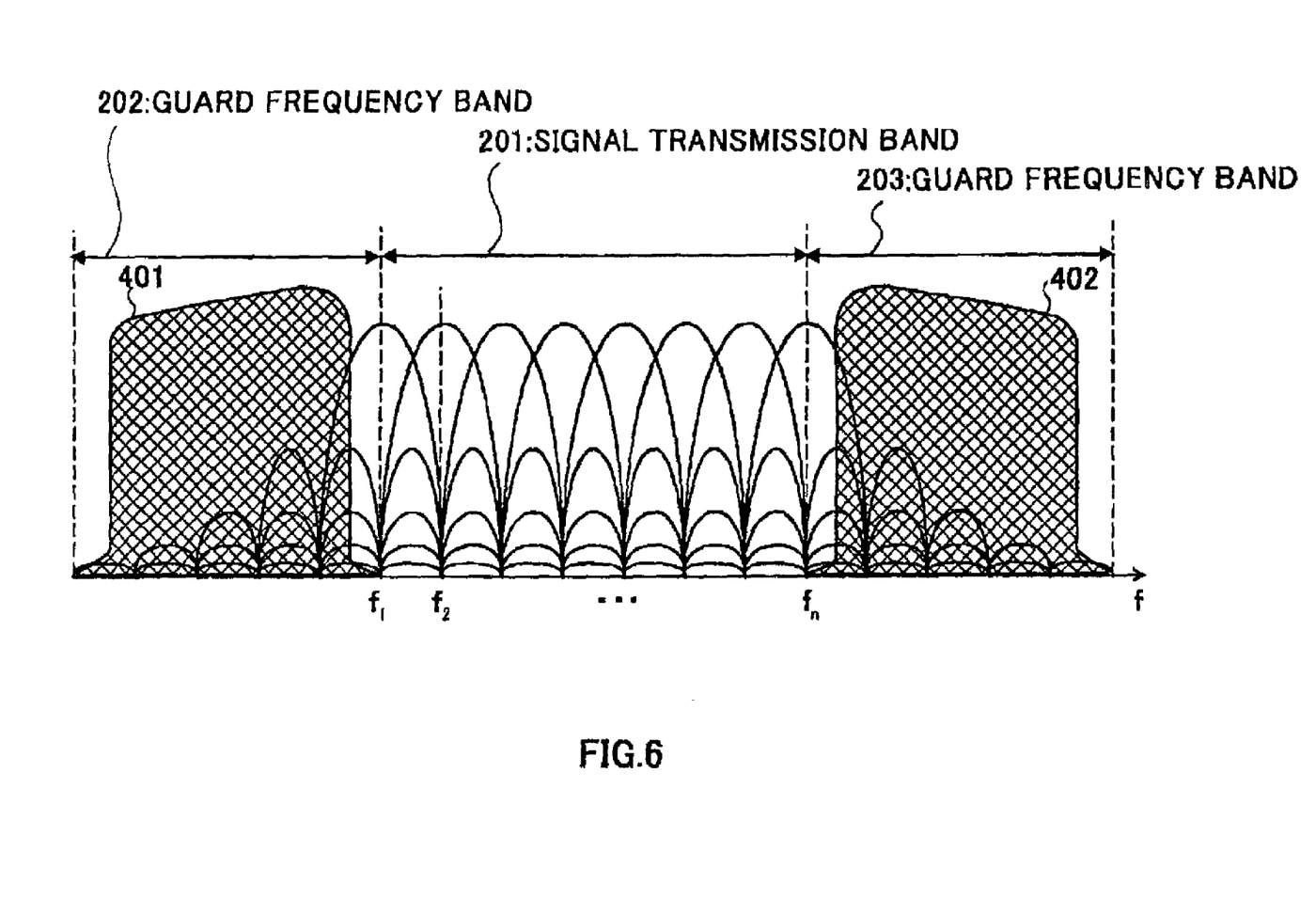
FIG. 6 is a frequency spectrum diagram for the OFDM method of Embodiment 2 of the present invention.

FIG. 6 is a frequency Spectrum diagram for the OFDM method of this embodiment. In guard frequency bands 202 and 203, interference is proportionately greater nearer the signal transmission band 201. Thus, in this embodiment, as shown in FIG. 6, in the transmitting apparatus the frequency spectra of broadcast information 401 and 402 are processed so that portions are larger the nearer they are to the signal transmission band before transmission. In the receiving apparatus, the opposite processing is carried out when performing demodulation.

By this means, it is possible to reduce band limited signal interference and improve reception quality.

(Embodiment 3)

Figure 7:
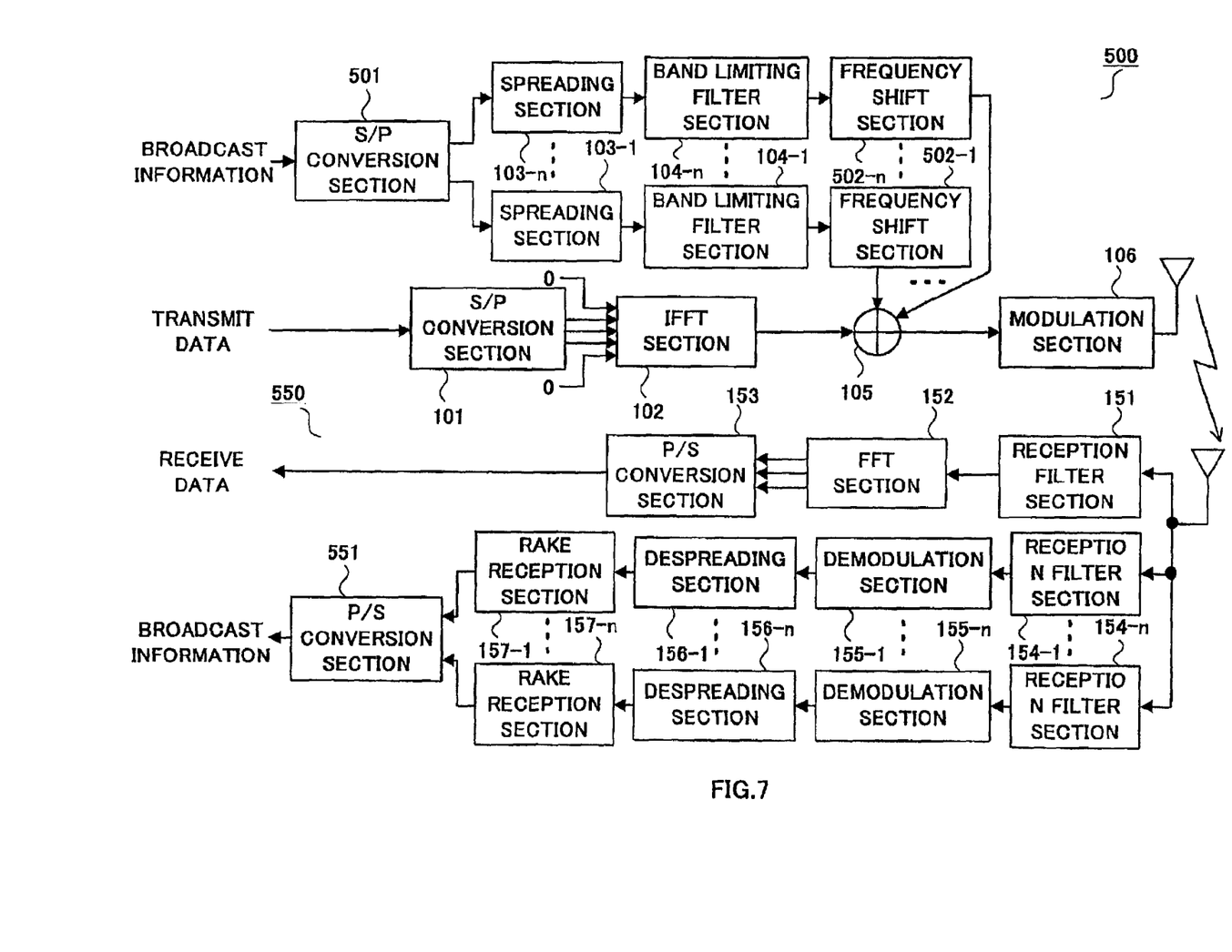
FIG. 7 is a block diagram showing the configuration of a transmitting apparatus and receiving apparatus according to Embodiment 3 of the present invention.

FIG. 7 is a block diagram showing the configuration of a transmitting apparatus and receiving apparatus according to Embodiment 3 of the present invention. The parts of the transmitting apparatus and receiving apparatus in FIG. 7 identical to those in FIG. 3 are assigned the same codes as in FIG. 3 and their detailed explanations are omitted.

The configuration of the transmitting apparatus 500 shown in FIG. 7 features the addition of an S/P conversion section 501 and a plurality of frequency shift sections 502 to the transmitting apparatus 100 shown in FIG. 3, and has a plurality of spreading sections 103 and band limiting filter sections 104.

The S/P conversion section 501 converts broadcast information to parallel form. Each of spreading sections 103-1 to 103-n (where n is a natural number not less than 2) multiplies the respective broadcast information converted to parallel form by a spreading code. Each of band limiting filter sections 104-1 to 104-n performs limitation so that the band of broadcast information output from the corresponding spreading section 103-1 to 103-n becomes part of a guard frequency band.

Frequency shift sections 502-1 to 502-n shift the frequency of band limited signals output from corresponding band limiting filter sections 104-1 to 104-n by a predetermined amount. This shift is performed so that no band limited signal overlaps a band in which another band limited signal is superimposed.

The adding section 105 adds together the OFDM modulation signal output from the IFFT section 102 and the band limited signal output from each of frequency shift sections 502-1 to 502-n.

The configuration of the receiving apparatus 550 shown in FIG. 7 features the addition of a P/S conversion section 551 to the receiving apparatus 150 shown in FIG. 3, and has a plurality of reception filter sections 154, demodulation sections 155, despreading sections 156, and rake reception sections 157.

Reception filter sections 154-1 to 154-n pass only signals of part of the guard frequency bands among received signals. Each of demodulation sections 155-1 to 155-n demodulates the signal that has passed through the corresponding reception filter section 154-1 to 154-n. Each of despreading sections 156-1 to 156-n multiplies the output signal of the corresponding demodulation section 155-1 to 155-n by the same spreading code as used by spreading sections 103-1 to 103-n. Each of rake reception sections 157-1 to 157-n performs rake reception of the output signal of the corresponding despreading section 156-1 to 156-n.

The P/S conversion section 551 converts the output signals of each of rake reception sections 157-1 to 157-n to serial form to obtain broadcast information.

Figure 8:
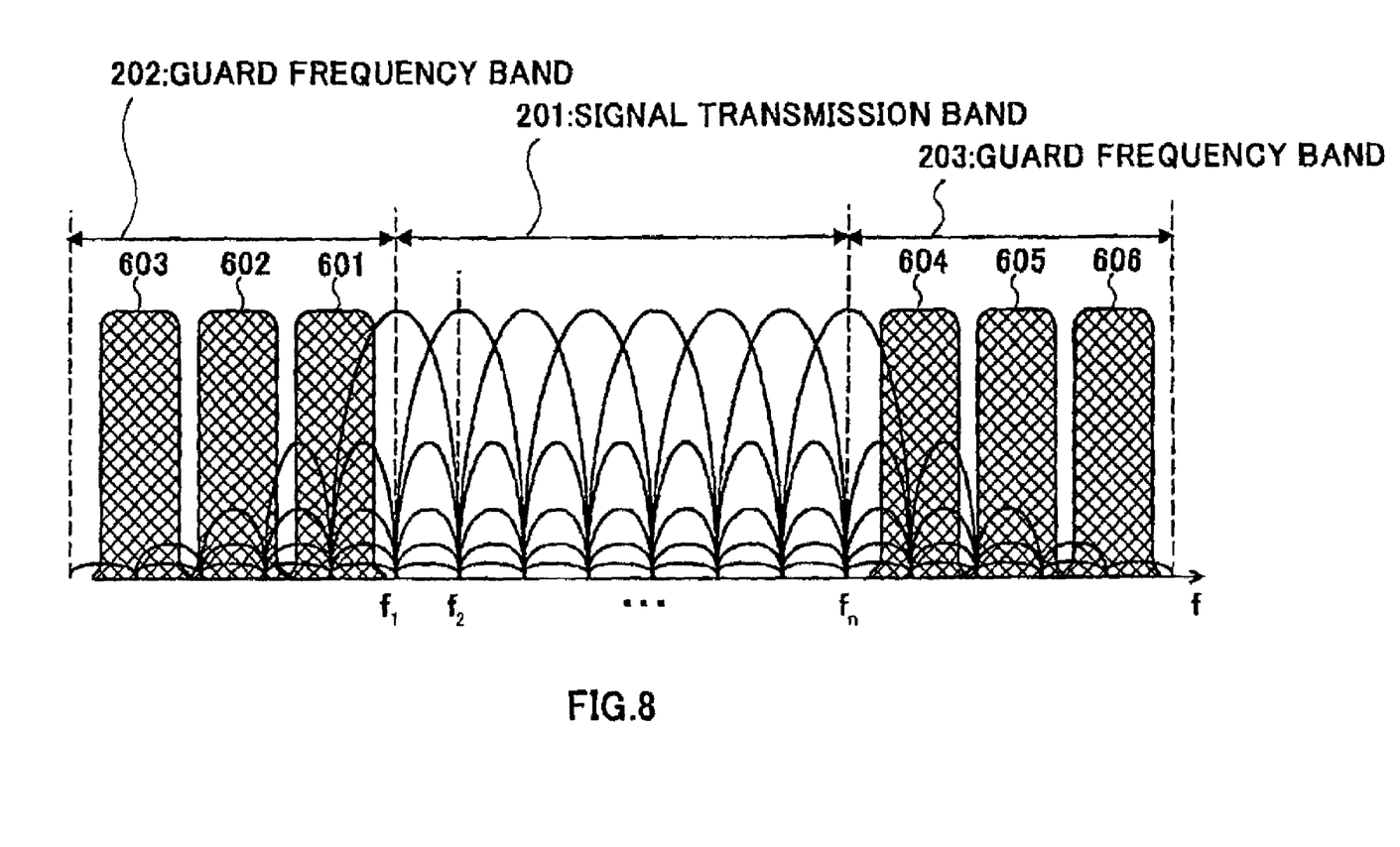
FIG. 8 is a first frequency spectrum diagram for the OFDM method of Embodiment 3 of the present invention.

FIG. 8 is a first frequency spectrum diagram for the OFDM method of this embodiment. As shown in FIG. 8, by shifting the frequencies of broadcast information band limited signals 601 to 606 that have been converted to parallel form so that they do not mutually overlap, it is possible to perform multicarrier superimposition in guard frequency bands 202 and 203.

Performing multicarrier superimposition of broadcast information, etc., in the guard frequency bands in this way enables multiplex information to be transmitted.

Figure 9:
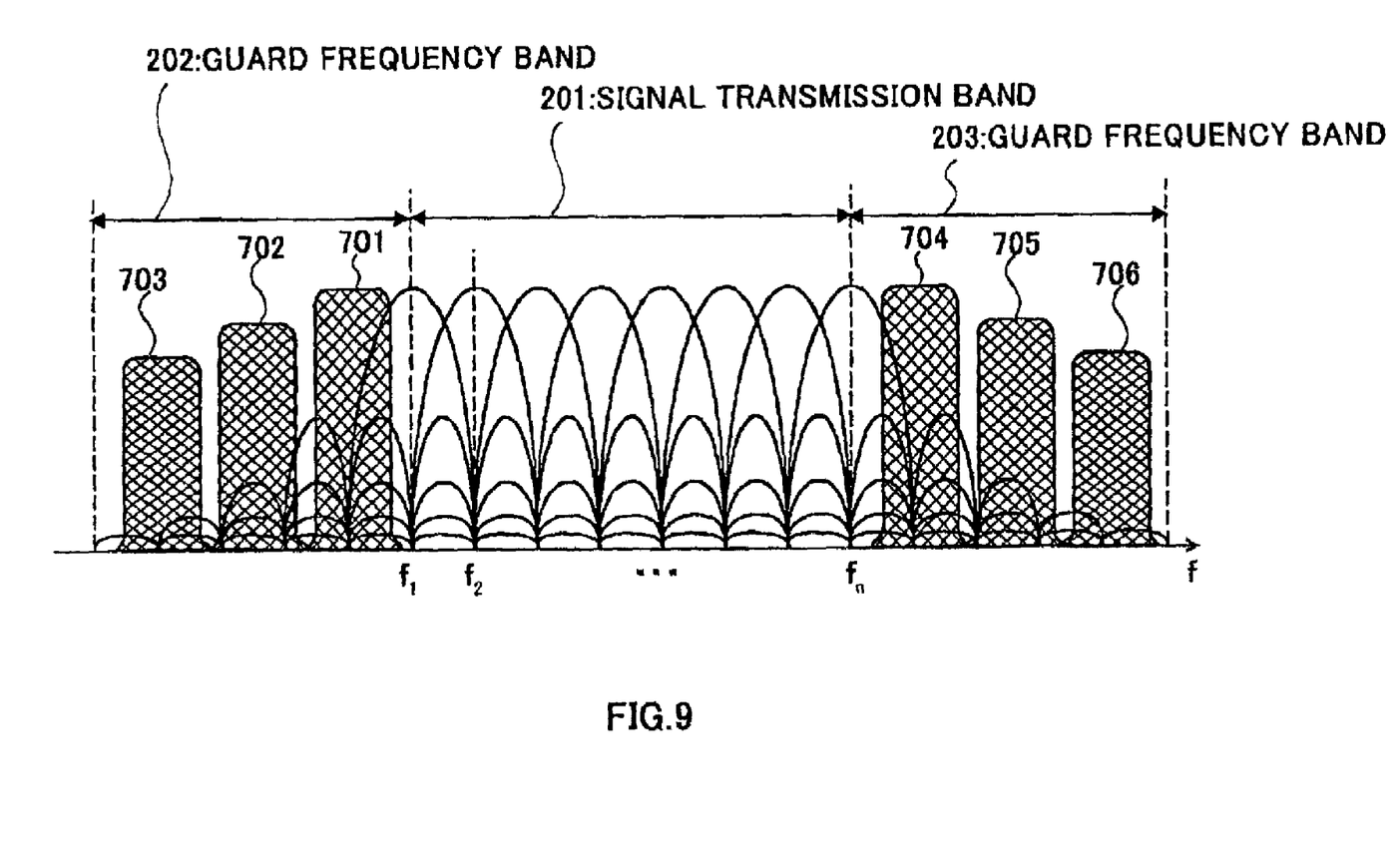
FIG. 9 is a second frequency spectrum diagram for the OFDM method of Embodiment 3 of the present invention.

As shown in FIG. 9, the power of band limited signals 601 to 606 superimposed on guard frequency bands 202 and 203 may be processed in the transmitting apparatus so that the spectrum is proportionately greater for those of band limited signals 701 to 706 nearer the signal transmission band 201 before transmission, and the opposite of the transmitting apparatus processing may be performed in the receiving apparatus.

By this means, it is possible for the quality of each broadcast information item converted to parallel form to be made equal.

(Embodiment 4)

Figure 10:
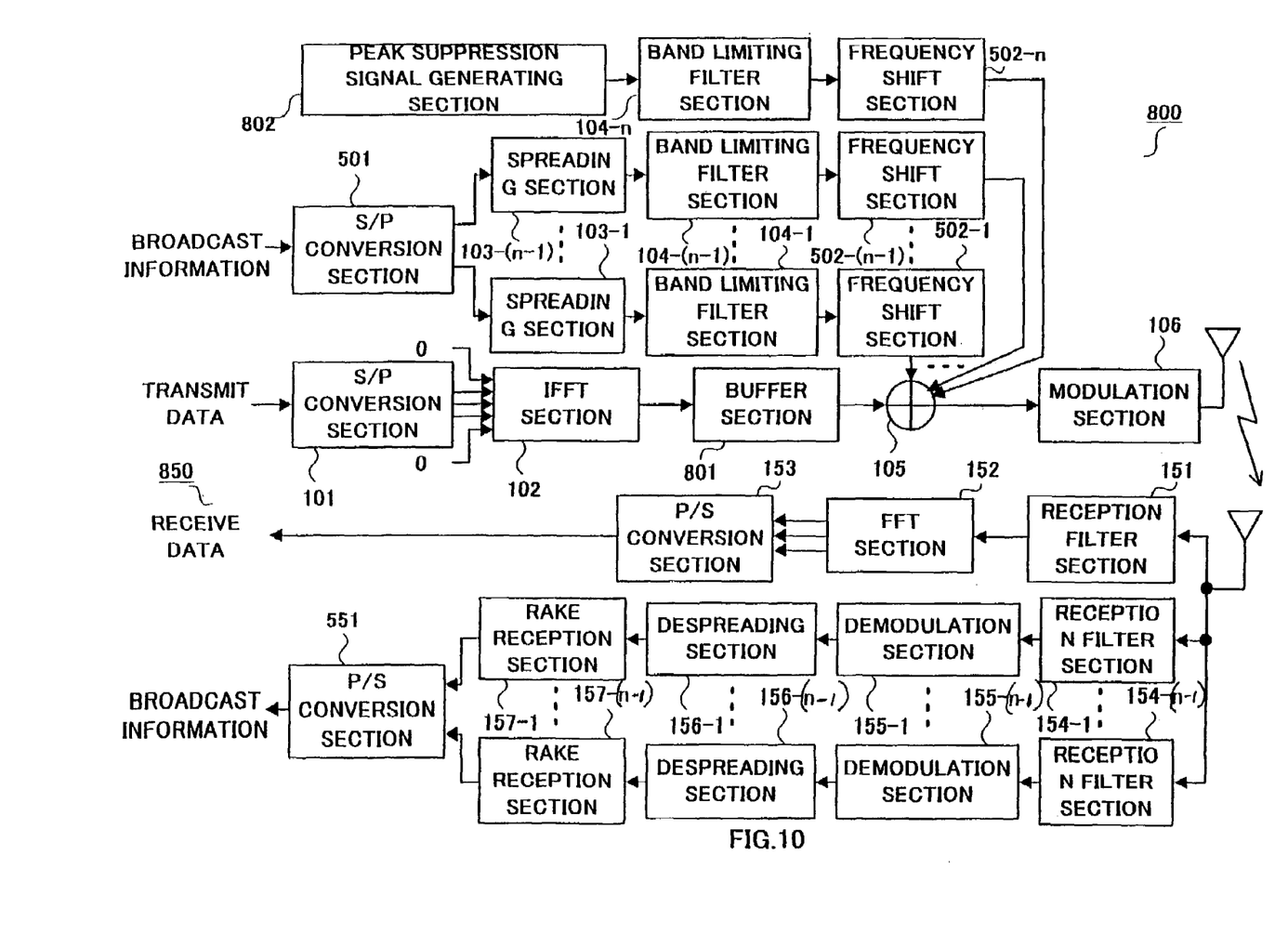
FIG. 10 is a block diagram showing the configuration of a transmitting apparatus and receiving apparatus according to Embodiment 4 of the present invention.

FIG. 10 is a block diagram showing the configuration of a transmitting apparatus and receiving apparatus according to Embodiment 4 of the present invention. The parts of the transmitting apparatus and receiving apparatus in FIG. 10 identical to those in FIG. 7 are assigned the same codes as in FIG. 7 and their detailed explanations are omitted.

The configuration of the transmitting apparatus 800 shown in FIG. 10 features the addition of a buffer section 801 and peak suppression signal generating section 802 to the transmitting apparatus 500 shown in FIG. 7, and the elimination of spreading section 103-n.

The buffer section 801 temporarily stores an OFDM modulation signal output from the IFFT section 102.

The peak suppression signal generating section 802 generates a peak suppression signal according to the composite amplitude (composite peak) of OFDM modulation signals stored in the buffer section 801. This peak suppression signal lowers this composite amplitude to a predetermined level.

Band limiting filter section 104-n limits the band of the peak suppression signal so that it becomes part of a guard frequency band. Frequency shift section 502-n shifts the frequency of the band limited signal output from band limiting filter section 104-n by a predetermined amount.

The configuration of the receiving apparatus 850 shown in FIG. 10 features the elimination of reception filter section 154-n, demodulation section 155-n, despreading section 156-n, and rake reception section 157-n from the transmitting apparatus 500 shown in FIG. 7.

The P/S conversion section 551 converts the output signals of each of rake reception sections 157-1 to 157-(n–1) to serial form to obtain broadcast information.

By performing multicarrier superimposition of broadcast information band limited signals converted to parallel form and a peak suppression signal that suppress the composite amplitude of OFDM modulation signals on the guard frequency bands in this way, it is possible to suppress peaks and transmit multiplex information.

Also, as the peak suppression signal is not superimposed on the signal transmission band on which OFDM modulation signals are superimposed, the use of a peak suppression signal does not lower spectrum efficiency as has been the case heretofore.

Here, the quality of a subcarrier near the signal transmission band 201 is poor because interference from OFDM modulation signals is great. On the other hand, since a peak suppression signal itself does not carry information, demodulation is not necessary, and there is no problem even if quality is poor. Therefore, by superimposing a peak suppression signal on a band near the signal transmission band 201, it is possible to superimpose broadcast information on a band in which there is little interference, and to improve the quality of that broadcast information.

As is clear from the above description, according to the present invention a guard frequency band can also be used for signal transmission by superimposing broadcast information, a peak suppression signal, or the like, on a guard frequency band, thereby enabling spectrum efficiency to be improved.

This application is based on Japanese Patent Application No.2000-072818 filed on Mar. 15, 2000, entire content of which is expressly incorporated by reference herein.

INDUSTRIAL APPLICABILITY

The present invention is suitable for use in a communication terminal apparatus or base station apparatus in a mobile communication system using the OFDM modulation method.

The invention claimed is:

1. A transmitting apparatus comprising:
an inverse Fourier transformer that performs an inverse Fourier transform on transmit data converted to parallel form to obtain a first signal;
a spreader that spreads a second signal;
a first filter that limits the band of the spread second signal to a guard frequency band adjacent to the band of the first signal; and
a transmitter that transmits a signal comprising the first and second signals.

2. The transmitting apparatus according to claim 1, further comprising a first spectrum processor that processes the spectrum of the second signal output from the first filter so that it becomes greater the nearer it is to the band of the first signal.

3. A receiving apparatus comprising:
a second filter that passes only signals in a guard frequency band among signals transmitted from the transmitting apparatus according to claim 2; and
a second spectrum processor that performs the opposite processing to that of the first spectrum processor on a signal that has passed through the second filter.

4. The transmitting apparatus according to claim 1, further comprising:
a shifter that shifts the bands of a plurality of second signals output from the first filter so as not to overlap mutually within the range of the guard frequency band, wherein
the signal transmitted by the transmitter comprises the plurality of second signals output from the shifter.

5. The transmitting apparatus according to claim 4, wherein the shifter comprises a generator that generates a third signal for suppressing the composite amplitude of the first signal and shifts the bands of a plurality of second signals, output from the first filter, and the third signal so as not to overlap mutually within the range of the guard frequency band.

6. The transmitting apparatus according to claim 5, wherein the shifter shifts the third signal so as to be placed in a part of the signal transmit by the transmitter that is adjacent to the band of the first signal.

7. A receiving apparatus comprising a second filter that passes only signals in a guard frequency band among signals transmitted from the transmitting apparatus according to claim 1.

8. A receiving apparatus comprising:
a second filter that passes only signals in a guard frequency band among signals transmitted from the transmitting apparatus according to claim 1; and
a despreader that despreads a signal that has passed through the second filter.

9. A communication terminal apparatus equipped with a transmitting apparatus, the transmitting apparatus comprising:
an inverse Fourier transformer that performs an inverse Fourier transform on transmit data converted to parallel form to obtain a first signal;
a spreader that spreads a second signal;
a first filter that limits the band of the spread second signal to a guard frequency band adjacent to the band of the first signal; and
a transmitter that transmits a signal comprising the first and second signals.

10. A base station apparatus equipped with a receiving apparatus, wherein the receiving apparatus comprises a second filter that passes only signals in a guard frequency band among signals transmitted from the communication terminal apparatus according to claim 9.

11. A base station apparatus equipped with a transmitting apparatus, the transmitting apparatus comprising:
an inverse Fourier transformer that performs an inverse Fourier transform on transmit data converted to parallel form to obtain a first signal;
a spreader that spreads a second signal;
a first filter that limits the band of the spread second signal to a guard frequency band adjacent to the band of the first signal; and
a transmitter that transmits a signal comprising the first and second signals.

12. A communication terminal apparatus equipped with a receiving apparatus, the receiving apparatus comprising a second filter that passes only signals in a guard frequency band among signals transmitted from the base station apparatus according to claim 11.

13. A data transmission method comprising:
inverse Fourier transforming transmit data converted to parallel form to obtain a first signal;
spreading a second signal;
limiting the band of the spread second signal to a guard frequency band adjacent to the band of the first signal;
transmitting a signal comprising the first and second signals;
Fourier transforming the first signal and extracting the transmit data; and
demodulating the guard frequency band of the transmitted signal to extract the second signal.

14. The data transmission method according to claim 13, further comprising:
spectrum processing the spectrum of the second signal, after limiting the second signal, so that it becomes greater the nearer it is to the band of the first signal; and
performing the opposite processing to that of the spectrum processing prior to demodulating the guard frequency band.

15. The data transmission method according to claim 13, further comprising performing multicarrier transmission of the second signal.

* * * * *